R. HODGIN.
STRAW CUTTER.
No. 10,860.
PATENTED MAY 2, 1854.
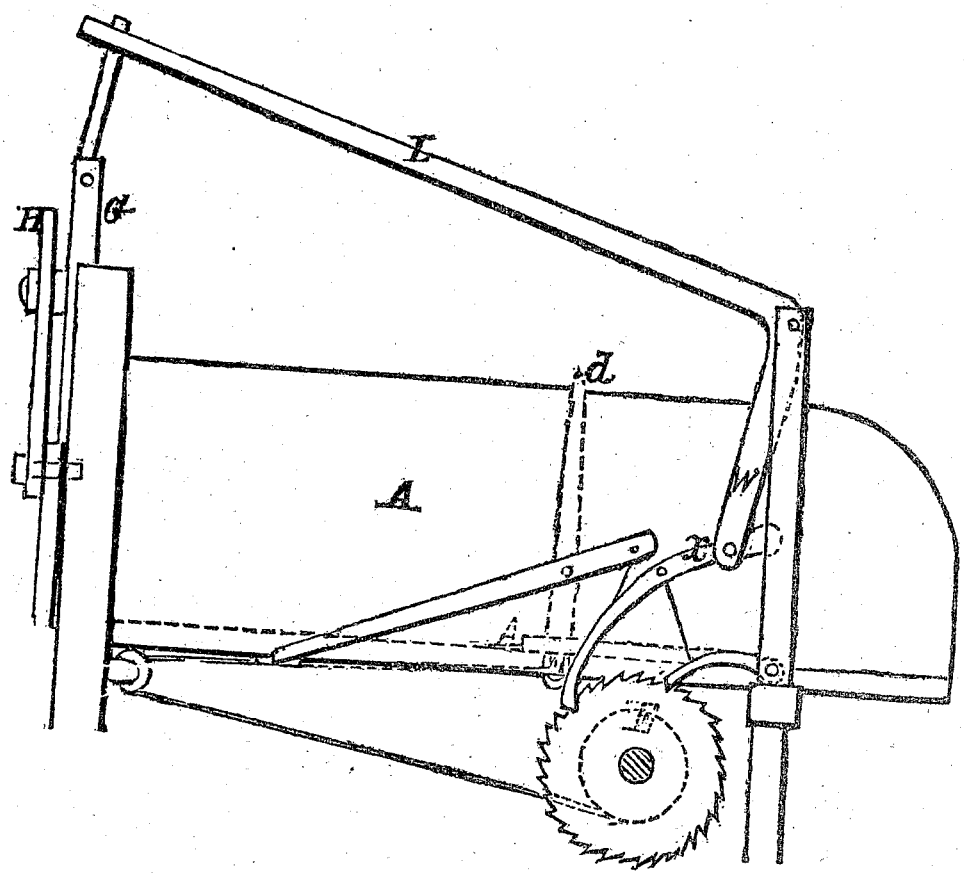
TAKEN FROM PATENT OFFICE REPORT
1854 - VOL. II -
ONLY DRAWING ACCESSIBLE (1913)

UNITED STATES PATENT OFFICE.

ROBERT HODGIN, OF BARNESVILLE, OHIO.

STRAW-CUTTER.

Specification of Letters Patent No. 10,860, dated May 2, 1854.

*To all whom it may concern:*

Be it known that I, ROBERT HODGIN, of Barnesville, Belmont county, Ohio, have invented a new and useful Machine for Cutting Straw and All Kinds of Fodder for Stock; and I do hereby declare that the following is a full, clear, and exact description of the construction and operation of the same, reference being had to the annexed drawings, making a part of this specification, in which like letters represent corresponding parts of said machine.

The nature of my invention consists in carrying forward the feed or straw to be cut, the entire length of the cutter box by an intermittent motion, the straw rack, or forked-rest upon which the fodder or feed to be cut is placed, being carried forward toward the cutter or knife, the entire length of the cutter box, and thus carrying with it the stalks, straw or other substance placed upon it.

I am aware that feed is in many machines supplied to the knife by means of rollers on which spikes are placed to engage with the straw, also that others have a rake operated by a lever or crank motion so as to engage with the straw by striking into it either from above or below the straw or fodder. In all these cases the feed is liable to a failure in being carried forward to the knife by the operation of the machine; but in mine the feed or straw resting upon a platform which is by the construction of the machine carried forward the entire length of the cutter box (or nearly so) any failure to supply the knife with substance to be cut is entirely obviated. In all other "straw cutters" with which I am acquainted the supply of the fodder to the knife is effected by means of some device operating directly on the same from one point, said device working upon a stationary axis.

To enable others skilled in the art to make and use my invention I will proceed to describe its construction and operation.

I construct a cutter box A of the ordinary dimensions resting upon the main frame B and a cross beam C near the rear end of the box supported by the leg D. Forward of the cross beam and fastened to both sides of the cutter box, supports $a$ are placed to hold the roller E one of the bearings of which on one side of the cutter box, extend through the support $a$ so as to attach to it the rachet wheel F hereinafter named. In the main frame, the cutter frame G is placed which supports the knife $b$.

To the cutter frame at the point $c$ for a fulcrum is attached the lever H from the end of which at the point $e$ the upright bar $f$ extends down to the bottom piece $g$ of the main frame and is attached thereto by the pin $h$ which extends through said bottom piece and also through the rear end of the pedal I. From this pedal extends a rod $i$ working loose at each end on pins where it connects with the pedal and at the center of the cross bar $j$, which cross bar is supported in the uprights $k$ which pass up through the bottom of the cutter box in ways cut out on the inside of its side pieces of sufficient depth and width for said uprights $k$ to work up and down with ease when the pressure piece $l$ is brought down upon the hay or straw being cut; said pressure piece being placed inside of the cutter box just in rear of the knife and attached to the said uprights $k$ so as to work loose therein and accommodate itself to the passage of the substance to be cut.

On one side of the cutter box at the point $m$ I attach the spring $o$, with a cord passing from its end at $p$ down to the pedal as shown in red line, and secured to it at the point $q$. This cord is fastened at the points named so as to strain the spring sufficient to cause an elevation of the pressure piece and its frame supporting it, to a proper height above the bed of the cutter box for the passage of the straw after the pressure piece is brought down upon the straw by the foot of the operator being placed upon the pedal I. From one of the uprights of the cutter frame at the point $r$, the short bar $s$ passes up to and is secured in the end of the long bar L by means of the pin $t$ upon which the said short bar works. This long bar extends back nearly the length of the cutter box and is supported by a pin passing through the ear $u$ on top of one of the side pieces of the cutter box and the top of the post M. The bar L at the point where the pin $v$ passes through it, is bent down at right angles with the longer portion of said bar and thus forms a short bar $w$ which works the iron pawl $x$ resting upon and engaging with the rachet wheel F.

From the pawl $x$ a short cord passes down to a smaller iron pawl $y$, which also engages with the ratchet wheel. At the point $z$ a lever $a'$ is secured to the outside of the cutter box with the point $z$ as a fulcrum. From the end of the lever $a'$ farthest from the main frame, a short cord passes down and is attached to the forward end of the pawl $x$. These two pawls $x$ and $y$ are also connected by a cord so that both can be thrown in and out of gear at the same time. The end of the lever $a'$ nearest to the main frame rests upon a strip $c'$ which is screwed to the bottom of the cutter box, and is movable so as to be detached at pleasure from under the lever $a'$, thus allowing the said end of the lever to drop down below the bottom of the cutter box and throw the two pawls $x$ and $y$ out of gear with the ratchet wheel.

Inside of the cutter box and resting upon its bottom I construct a straw-rest or platform $A'$ upon which the material to be cut is placed, it being a board of suitable thickness and length and of nearly the same width as the bottom of said box in the clear. From its forward end three or more tines or forks $d'$ extend upward to the height of the box, which forks sustain the material to be cut in proper place and assist in carrying the fodder to the knife.

In the under side of the straw-rest and near its forward end a hook or staple is driven, the staple being of sufficient length to extend through a longitudinal opening in the bottom of the cutter box. To this staple a cord is attached which extends forward beneath said box over a pulley situated on the rear part of the main frame, and thence passes back toward the rear end of the cutter box beneath and fastened to the roller upon which the ratchet whel is situated.

The operation of the machine is as follows: The lever H being raised as seen in the drawing carries with it the cutter frame G which elevates the front end of the long bar L and thus throws forward the short bar $w$. This movement forces the larger pawl $x$ forward, which being engaged with the ratchet wheel turns forward the roller E, thus winding around said roller the cord extending over the pulley and attached to the straw rest, and consequently forces the straw-rest with the material upon it to the knife. The operator then presses one foot upon the pedal I which draws down the pressure piece upon the fodder so as to give a firm cut of the knife upon the descending movement of the cutter frame. The lever H is then brought down and the cut effected. As the lever descends the long bar L is brought down thus giving the short bar $w$ a backward movement which also brings back the two pawls $x$ and $y$ upon the ratchet wheel ready for another turn forward when lever L is again elevated. This elevation and depression of the lever L is continued until the straw-rack is advanced toward the knife as far as the length of the cord will permit. The end of the small strip $e'$ beneath the cutter box on the side where the operator stands is then moved back toward the tail of the cutter box; this throws its opposite end forward, upon which, one end of the lever $a'$ rests and permits the end of said lever which rested upon said strip to drop below the bottom of the cutter box and by this means throw the ratchet wheel and the two pawls $x$ and $y$ out of gear. The operator thereupon shoves back the straw-rest to the tail of the cutter box and again filling the box with the material to be cut, resumes the operation of the machine.

I disclaim the use of an endless belt for the purpose of feeding the straw or other material to the knife, but

What I claim as my invention and desire to secure by Letters Patent is—

The straw-rest $A'$ for supplying the straw to the knife, said straw-rest or rack being carried the entire length from rear to front end of the cutter box by an intermittent forward motion, as set forth.

ROBERT HODGIN.

Signed in the presence of—
BENJN. MACKALL,
JESSE BALL.